March 31, 1953 R. C. HERGENROTHER ET AL 2,633,546
OSCILLOSCOPE
Filed July 19, 1952 3 Sheets-Sheet 1
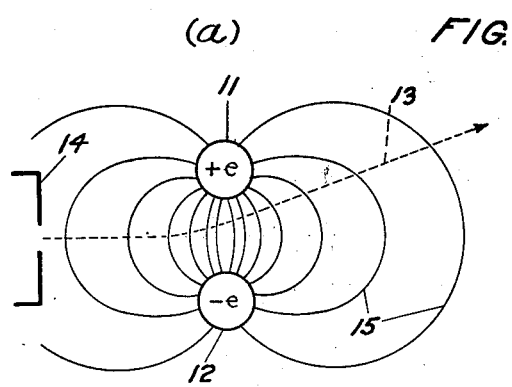
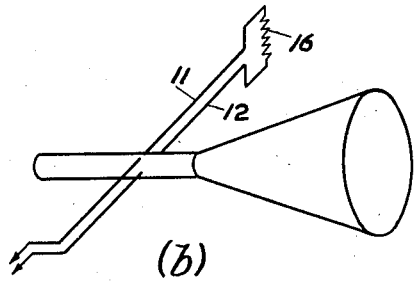
FIG. 1
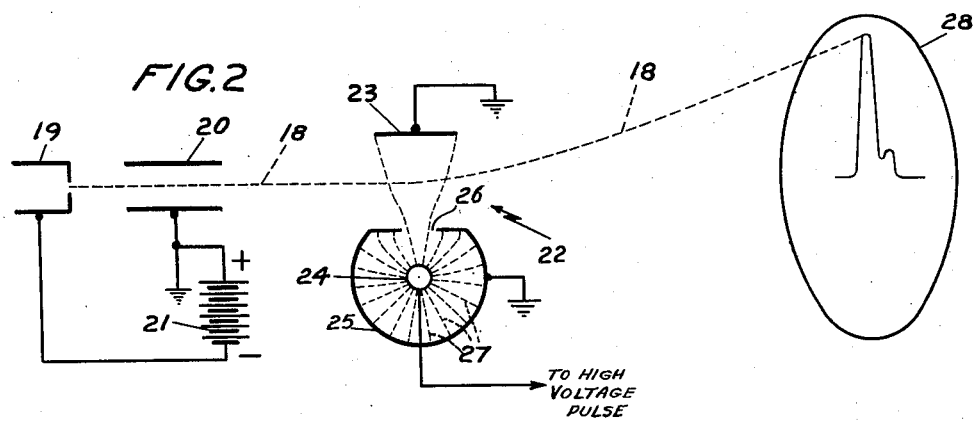
FIG. 2
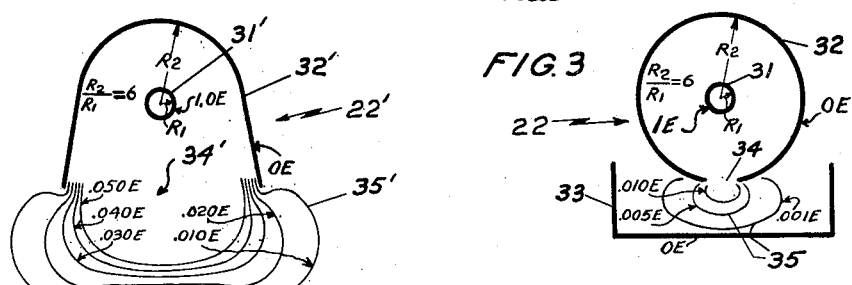
FIG. 3
FIG. 4
INVENTORS
RUDOLF C. HERGENROTHER
HERMANN GUNTHER RUDENBERG
BY Elmer J. Gorn
ATTORNEY

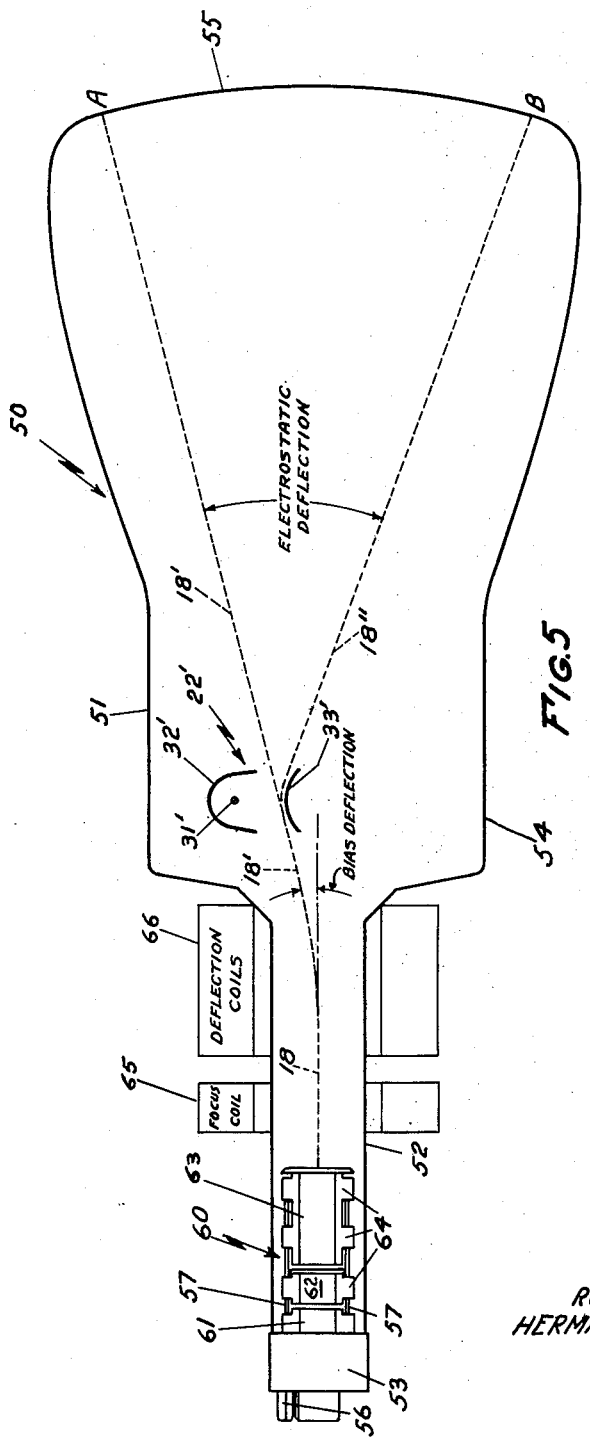

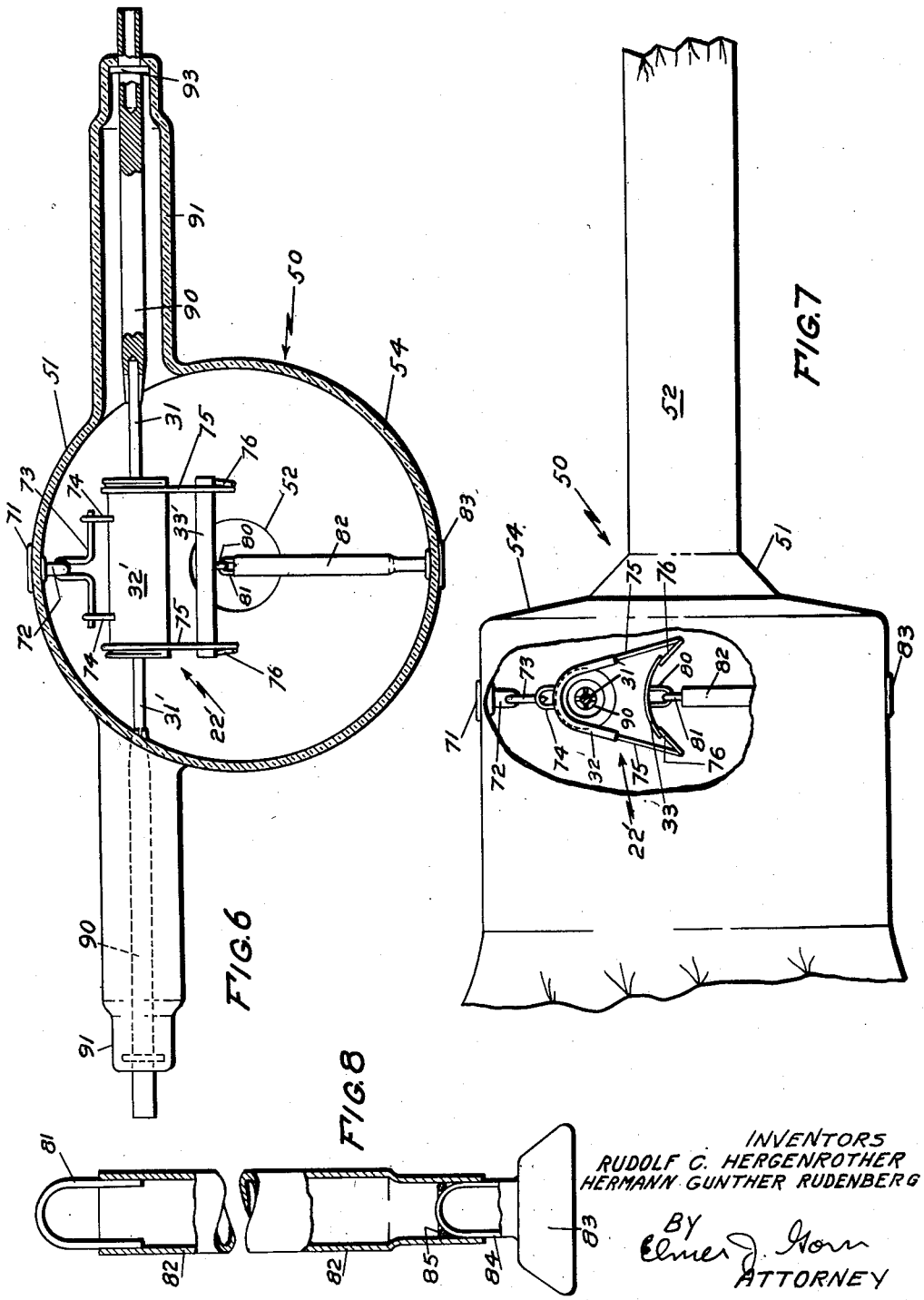

Patented Mar. 31, 1953

2,633,546

UNITED STATES PATENT OFFICE 2,633,546

OSCILLOSCOPE

Rudolf C. Hergenrother, West Newton, and Hermann Gunther Rudenberg, Newton, Mass., assignors to Raytheon Manufacturing Company, Newton, Mass., a corporation of Delaware Application July 19, 1952, Serial No. 299,846

11 Claims. (Cl. 313—78)

This invention relates to a cathode ray tube oscilloscope adapted to measure high voltage signals, and, more particularly, relates to an electrostatic deflection system having a reduced deflection sensitivity for use in an oscilloscope capable of measuring high voltage signals.

An object of this invention is to provide an electrostatic deflection system having a reduced deflection sensitivity.

Another object of this invention is to provide an improved oscilloscope for the measurement of high voltage signals.

Still another object of this invention is to provide an oscilloscope having a deflection system of reduced deflection sensitivity capable of being operated directly at high voltages.

A further object of this invention is to provide an oscilloscope which may be calibrated with an accelerating voltage which is small compared with the voltage to be measured.

A final object of this invention is to provide an oscilloscope for measurement of signals of a single polarity which utilizes substantially the entire portion of the oscilloscope screen for presentation.

As radar transmitter powers have increased, requiring higher peak pulse voltages and narrower pulse widths, the problem of measuring modulator pulse shapes and amplitudes has become increasingly difficult.

The conventional method of measuring high voltages by using a voltage dividing network to reduce the voltage to a level which can be applied to the deflection plates of a cathode ray oscilloscope runs into serious limitations when voltages of the order of 100 kv. and pulse widths of the order of a fraction of a microsecond are to be measured. These difficulties arise because the required resistor power dissipation is high and the resistor distributed capacity is high. Direct measurement of the peak pulse voltage by rectification is also restricted because diodes suitable for operation at such high voltages are not available.

The measurement of the shape and amplitude of narrow high voltages would, however, become simple and accurate if a cathode ray tube, having an electrostatic deflection system capable of being operated directly at the required high voltage levels, were available. Since the deflection factor of volts per radian beam deflection of an eletcrostatic deflection system is proportional to the anode voltage, it would be possible in such a tube to calibrate the electron spot deflection using a low anode voltage and to measure voltages using a high anode voltage, thus considerably reducing the D. C. calibration voltage requirement by a factor of 5 or 10.

The deflection electrodes must be designed so that high potential gradients, which might cause cold emission, are avoided. Also a substantial insulation surface length must separate the electrodes in the vacuum envelope as well as outside, to avoid insulation breakdown. The deflection factor of volts per radian of electron beam deflection of this electrostatic deflection system is required to be about fifty times that of a conventional oscilloscope tube and this factor is required to be essentially constant over the full deflection range.

If $E$ is the voltage between deflection plates and $c$ is the capacitance per unit width of the deflection plates, it has been shown by H. G. Rudenberg in an article appearing at pages 279 through 284 in the Journal of Applied Physics, vol. 16, No. 5, May 1945, entitled "Deflection Sensitivity of Parallel-Wire Lines in Cathode Ray Oscillographs" that the change of angle $\theta$ of the beam in radians produced while traveling through the deflection field is given by $$\theta = \frac{Ec}{2V\epsilon_0} \qquad (1)$$

where $V$ is the accelerating potential which is the mean direct current potential of the two deflection plates with respect to the cathode of the electron gun and usually the same as the second anode potential and $\epsilon_0$ is the dielectric constant of free space.

From Equation 1 it is apparent that, in order to increase the deflection factor of volts per radian beam deflection $$\frac{E}{\theta}$$

the plate-to-plate capacitance of the deflection system should be made as low as possible. This can be accomplished by making the plates shorter and increasing their separation. If the length of the plates is decreased sufficiently and the spacing is increased sufficiently, the plates shrink to two parallel wires whose separation is large compared with their diameters.

Since the capacitance per unit length of a parallel-wire line is given by $$c = \frac{\pi \epsilon_0}{\cosh^{-1} \frac{d}{2r}} \quad (2)$$

where $r$ is the radius of the wires and $d$, the center-to-center separation of the wires, the beam deflection angle $\theta$, as given by Equation 1, becomes $$\theta = \frac{\pi E}{2V \cosh^{-1} \frac{d}{2r}} \quad (3)$$

The deflection factor $$\frac{E}{\theta}$$

is therefore given by $$\frac{E}{\theta} = \frac{2}{\pi} V \cosh^{-1} \frac{d}{2r} \quad (4)$$

If it is desired to obtain a deflection of one radian with a measured deflection voltage of 100 kv. while using an anode voltage of, say 10 kv., Equation 4 gives $$\cosh^{-1} \frac{d}{2r} = \frac{\pi}{2} \frac{E}{V\theta} \quad (5)$$

from which $$\frac{d}{2r} = \cosh \frac{\pi}{2} \frac{E}{V\theta} \quad (6)$$

and $$\frac{d}{2r} = \cosh \frac{\pi}{2} \frac{10^5}{10^4 \times 1} = \cosh 5\pi = 3.32 \times 10^6 \quad (7)$$

The lower limit of $r$ is set by cold emission effects which require that the potential gradients at the conductor surfaces should be less than $10^6$ volts per centimeter. From the above computation it is evident that it is practically impossible to meet the deflection requirements for such high voltages by modification of the conventional deflection system in the form of a parallel-wire line and that some other type of deflection system must be devised.

One method of attenuating an electric field is to set up the field between a first electrode and a second electrode which is surrounded by an apertured shield.

In accordance with this invention, the high voltage deflection electrode of the oscilloscope is partially shielded so that only the field fringing through an aperture in the shield can deflect the electron beam. By properly dimensioning the aperture any reasonable reduction of deflection sensitivity (increase in deflection factor) may be obtained, since only a comparatively few electric lines of force reach through the aperture and act on the electron beam rather than terminating on the shield.

For example, one form of electrostatic deflection assembly may comprise a cylindrical high voltage deflection electrode surrounded by a coaxial cylindrical shield containing a small slot or aperture therein. The aperture is arranged in juxtaposition with the other deflection electrode of the cathode ray tube which may be at ground potential. By proper adjustment of the aperture in the shield, a comparatively large deflection factor and a deflection factor which is substantially independent of deflection angle may be obtained.

Many voltages to be measured, such as the output pulses of radar modulators, are negative with respect to ground. The shielded electrode of the deflection assembly is used as the high voltage electrode and the other electrode, together with the accelerating anode and shield, is connected to ground. The deflection field will, therefore, cause the electron beam to be bent away from the shielded electrode. If the deflection system were aligned with the cathode ray tube axis, only one-half the fluorescent screen would be available for displaying the pulses. In order to utilize the entire face of the fluorescent screen for pulse display, the deflection system is displaced from the cathode ray tube axis and a fixed deflection is imparted to the electron beam by either an electrostatic field or by an electromagnetic field surrounding the cathode ray tube, causing the beam to pass through the deflection field to one edge of the fluorescent screen.

The deflection factor of the tube is calibrated by using a readily obtainable measured anode voltage which may, for example, be of the order of magnitude of one or two kv. and applying a measured direct current voltage to the deflection system sufficient to produce full scale deflection. Calibration of the cathode ray tube is based on the fact that the deflection factor $$\frac{E}{\theta}$$

is directly proportional to the anode voltage V; that is, the deflection factor during actual pulse measurement is equal to the calibration deflection factor multiplied by the ratio of the anode voltage used during measurement and the anode voltage used during calibration.

Suppose that the screen is to be calibrated for a full scale deflection $E_m$ volts in the neighborhood of 100 kv. and an anode voltage $V_m$ is needed to produce said deflection. It is impractical to apply a measured direct current voltage $E_m$ of this magnitude to the cathode ray tube for calibration purposes since direct current voltages of such large magnitude are costly and difficult to generate and control. If the anode is operated at a value $V_c$ which is $$\frac{1}{n}$$

times that of $V_m$ where $n$ is any number, then a deflection voltage $E_c$ of only $$\frac{E_m}{n}$$

volts is needed on the deflection electrodes to produce the same full scale deflection. The cathode ray tube may then be calibrated with a more convenient and more readily obtainable measured voltage $E_c$ and the scale multiplied by the factor $n$. By calibrating the beam deflection using a low anode voltage and using a high anode voltage for measurement of the pulses, the direct current calibration voltage requirement may be reduced by a factor of at least ten.

In the drawings:

Fig. 1 is an illustration of a parallel wire deflection system for a cathode ray tube;

Fig. 2 is a diagrammatic view of a cathode ray tube utilizing a deflection system in accordance with the invention;

Figs. 3 and 4 disclose two possible forms of electrostatic deflection systems for use in the cathode ray tube of Fig. 2;

Fig. 5 illustrates an embodiment of a cathode ray tube oscilloscope embodying the invention;

Fig. 6 is a transverse sectional view, taken adjacent said deflection system, of a cathode ray tube oscilloscope of the type schematically illustrated in Fig. 5 with the deflection coils and horizontal deflection system omitted for reasons of clarity;

Fig. 7 is a fragmentary central longitudinal sectional view, partly broken away, of the oscilloscope shown in Fig. 5, minus the deflection coils and horizontal deflection system; and Fig. 8 is a detailed section view of a connector button assembly of the oscilloscope shown in Figs. 5 to 7.

In Fig. 1, a parallel wire deflection system is shown comprising a pair of parallel wires 11 and 12 positioned perpendicular to the electron beam 13 emitted from electron gun 14. The lines of force 15 of the electrostatic field is shown in Fig. 1a. The deflection system may be terminated at one end by its characteristic resistance 16 if operation over a wide band of frequencies is desired.

From Equation 1, the deflection angle of the electron beam depends upon the internal charge per unit width which can be placed on the system and upon the potential accelerating the electron beam axially, regardless of the design of the deflection system or the voltage applied to it. To increase the deflection factor of volts per radian beam deflection, it is necessary to decrease the plate-to-plate capacitance for a given value of accelerating voltage.

The parallel wire deflection system, while having a deflection factor less than that of the conventional deflection system using flat flared plates, is not applicable to deflection voltages greatly exceeding the electron beam accelerating voltage of the cathode ray tube since the value of $$\cosh \frac{\pi E}{2V\theta}$$

and the ratio $$\frac{d}{2r}$$

becomes excessive.

In the cathode ray tube of Fig. 2, a beam of electrons, shown by reference numeral 18, is emitted from electron source 19 of a conventional electron gun and accelerated by accelerating anode 20 which is connected to ground and to the positive terminal of a battery 21 or other direct current voltage source. The negative terminal of battery 21 is connected to electron source 19. The horizontal deflection system of the cathode ray tube is conventional and is omitted for reasons of clarity and simplicity. The vertical deflection system 22 comprises a first deflection electrode or plate 23 which is connected to ground in the usual manner and a second deflection electrode 24 in the form of a circular wire or rod substantially surrounded by a shield 25 containing an aperture 26. Shield 25, like accelerating anode 20, and first deflection electrode 23, is connected to ground. The ungrounded or negative terminal of a source of high voltage signals, which may be either alternating current or direct current, is adapted to be connected to deflection electrode 24.

The electric field produced between the two deflection electrodes 23 and 24 is indicated by the lines of force 27 of Fig. 2. Only a small proportion of the electric lines of force pass through aperture 26 of shield 25 to react with electron beam 18. By proper dimensioning of aperture 26, any reasonable increase in deflection factor may be obtained.

The application of the negative high voltage pulses to deflection system 22 causes the electron beam 13 to be deflected upward toward deflection electrode 23 so that a visual presentation of the pulses appears on the face 28 of the cathode ray tube, as shown in Fig. 2.

The electrostatic deflection system of Fig. 3 includes a pair of coaxial cylinders 31 and 32; the leakage field around the slot 34 in the outer cylinder 32 is utilized for deflection purposes. The inner cylinder 31 and outer cylinder 32 correspond, respectively, to the electrode 24 and shield 25 of Fig. 2. The deflection system of Fig. 3 also includes a second deflection electrode 33 which corresponds to the electrode 23 of Fig. 2. The equi-potential pattern for the configuration of Fig. 3 is shown by the lines 35. The relative values of the electric potentials E are indicated by the numerals preceding the letter E. The width of slot 34 chosen has been found to produce too high a deflection factor for many applications; moreover, considerable variation in field strength exists across the deflection space with a resulting undesirable variation of deflection factor with deflection angle.

An improved electrostatic deflection system 22' is shown in Fig. 4. The outer cylinder 32' of Fig. 4 has a U-shaped configuration and the aperture 34' is considerably larger than that of the system of Fig. 3. The second deflection electrode 33' of Fig. 4 is arcuate instead of rectangular, as in the system of Fig. 3, in order to more nearly approach the deflection field between double flared plates. Since the electron beam 18' approaches the deflection system at an angle, as shown in Fig. 5, and leaves the deflection system at extreme deflection at a reverse angle, as shown at 18'' in Fig. 5, the configuration of deflection electrode 33' is made to coincide as closely as possible with the curved path of the electron beam in order to obtain the maximum deflection for a deflection system of a given size and to minimize distortion in the fringing field. Furthermore, the curvature of the electrode 33' should be opposite that of the equi-potential lines 35' which are concave upward. A glance at the values of potential along the equi-potential lines 35' of Fig. 4 and the deflection system elements 31' to 33' indicate that the deflection field is not only quite uniform in the center of the deflection area but is greater than that of the system of Fig. 3, encompassing five per cent. of the total voltage applied to the system.

The dimensions to be chosen for this deflection system should be as small as possible for convenience in construction. A lower limit for the size will be set by the field intensity at the surface of the inner electrode of co-axial cylinders of radii $R_1$ and $R_2$. This field intensity is given by $$g = \frac{E}{R_1 \ln \frac{R_2}{R_1}} \qquad (8)$$

where $g$ is the potential gradient in volts/cm., $R_1$ is the radius of the inner cylinder, $R_2$ is the radius of outer cylinder and $E$ is the potential difference between cylinders in volts.

In order to avoid cold emission, voltage gradients should not exceed 10⁶ volts per centimeter.

If a deflecting voltage of .25×10⁶ volts is applied between coaxial cylinders having a diameter ratio of 6, which corresponds to the model, Equation 8 shows that the voltage gradient will be 10⁶ volts per cm. when the inner cylinder radius is .14 cm. An inner cylinder radius of approximately twice this value may be chosen for the design, giving a substantial factor of safety. For relatively low values of voltage, a considerable departure from the relative dimensions stated above may be made without substantially affecting the operation of the deflection system. As the voltages to be measured become higher and higher, the dimensions become increasingly critical.

Referring to Fig. 5, a cathode ray tube oscilloscope, generally indicated by reference numeral 50, comprises an evacuated glass envelope 51 having a neck 52 provided with the usual base 53 and an enlarged portion 54 in which the electrostatic deflection system 22' and fluorescent screen 55 are located. A plurality of pins 56 extending through base 53 is electrically connected to the various elements of an electron gun 60 mounted at the base end of the tube. The electron gun which may be supported by glass rods 57 rigidly secured within the tube by any suitable means comprises a cathode 61, a beam-forming electrode 62 and an accelerating anode 63 which are supported in coaxial alignment along the cathode ray tube axis by lugs 64 embedded in or otherwise connected to rods 57. The cathode 61, beam electrode 62 and anode 63 are preferably connected to points of increasingly positive potential, in the usual manner.

Surrounding neck 52 of the tube is a focus coil 65 and deflection coils 66 which may comprise a standard television deflection yoke. One set of deflection coils furnishes the horizontal time base deflection of the oscilloscope trace while the other set of coils provides a vertical deflection of the electron beam.

Although the use of a magnetic horizontal deflection system is more convenient, an electrostatic horizontal deflection system may be used in lieu thereof.

The vertical electrostatic deflection system 22' is the one shown in Fig. 4 comprising a first electrode 33', a second electrode 31' and an apertured shield 32' surrounding electrode 31'. The electron beam is deflected from its original path coincident with the cathode ray tube axis as shown by dotted line 18' so that, in the absence of any deflection signal to the electrostatic deflection system 22', the electron beam strikes the top of the screen at a point A. The electrostatic deflection system, therefore, is displaced from the tube axis so that the electron beam can pass through the field between the electrodes 32' and 33'. At maximum deflection, corresponding to the maximum input signal to deflection electrodes 31' and 33', the electron beam is bent downward as shown by dotted line 18" and strikes the bottom of the screen at a point B. By displacing the electrostatic deflection system 22' from the tube axis the entire face of the cathode ray tube screen may be utilized instead of just half of the screen whenever pulses of only one polarity are to be measured.

The physical arrangement of the electrostatic deflection system 22' within the enlarged portion 54 of envelope 51 is shown in Figs. 6 to 8 in which the elements corresponding to those of Fig. 5 are shown by like reference numerals. An electrical connection to shield 32' as well as a mechanical support for said shield will now be described. The deflection shield 32' is suspended from the wall of the tube by means of a connector button 71 sealed in the glass envelope 51 having a loop portion 72 through which a looped rod or wire 73 is positioned. Wire 73 is mechanically connected to two wire loops which encircle wire 73 and are spot welded to the top surface of shield 32. Connector button 71 and elements 72 to 75 also provide a suitable electrical connection from the external deflection voltage source to the shield.

The deflection electrode 33' is spaced from shield 32' by two sets of wire loops 75 welded to wires 76; the latter are, in turn, welded or otherwise secured to electrode 33'. An electrical connection from electrode 33' externally of the tube envelope 51 is provided by means of the assembly shown in detail in Fig. 8. A wire loop 80 is attached to the bottom of electrode 33' and engages a wire loop 81 welded to the inside wall of connector tube 82 at one end thereof. A connector button 83 is connected to the other end of connector tube 82 by means of a second wire loop 84 welded to the connector button and soldered within tube 82 by a solder ring 85, as shown clearly in Fig. 8. Electrode 33' and shield 32', as well as the supporting wires and contact buttons, are preferably made of a polished material, such as stainless steel. It is also possible to connect shield 32' and reflection electrode 33' internally to the accelerating anode 63 (see Fig. 5), in which case no external connections to connector buttons 71 and 83 need be used.

The deflection electrode 31' consists of a rod preferably made of stainless steel polished to a mirror finish to minimize cold emission resulting from irregularities in the surface of the rod. Electrode 31' is adapted to be inserted within a tubular recess in one end of each of the two metal rods 90, 90 which extends through the ends of the elongated transverse portion 91 of tube envelope 51. A glass disk 93 surrounding each of rods 90 provides a means for forming a hermetic seal between the rod and the glass envelope. The end of rods 90 into which electrode 31 is inserted is slotted so as to hold the rod-shaped electrode firmly in position within the tube.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A cathode ray tube for measurement of high voltage signals comprising an envelope containing a means for producing a concentrated electron beam, a first set of deflecting electrodes for producing a deflection of said beam in a first direction, a second set of deflection electrodes for producing deflection of said beam in a direction normal to said first direction, said second set of electrodes including a first unshielded electrode, and a second electrode arranged normal to said beam and surrounded by an apertured shield, means for connecting said first electrode and said shield to one terminal of a source of said high voltage signals and means for connecting said second electrode to the other terminal of said source.

2. A cathode ray tube for measurement of high voltage signals comprising an envelope containing a means for producing a concentrated electron beam, an electrostatic deflection system for producing a deflection of said beam, said deflection system including a first unshielded electrode, and a second electrode surrounded by an apertured shield, means for connecting said first electrode and said shield to one terminal of a source of said high voltage signals and means for connecting said second electrode to the other terminal of said source.

3. A cathode ray tube for the measurement of high voltage pulses comprising an electron gun positioned at one end of said tube for producing an electron beam, a focusing electrode and an accelerating anode, a screen disposed at the other end of said tube and adapted to be illuminated over the portion impinged by said electron beam, and an electrostatic deflection system to which said pulses are directly applied interposed between said accelerating electrode and said screen for deflecting said electron beam from its original path, said deflection system comprising a first unshielded electrode and a second electrode surrounded by a shield, said shield having an aperture therein arranged to partially expose said first and second electrode to one another.

4. A cathode ray tube comprising an envelope, means including a cathode and an accelerating anode for producing a concentrated electron beam therein, a fluorescent screen adapted to be impinged by said electron beam for providing a visual presentation of the position of said beam, a bias deflection system interposed between said electron gun and said screen for producing a fixed deflection of said beam away from the longitudinal axis of said tube and a second deflection system located between said first deflection system and said screen and displaced from said longitudinal axis, said second deflection system comprising a first unshielded electrode and a second electrode disposed transverse to said electron beam, said second electrode being surrounded by a shield having an aperture arranged to partially expose said first and second electrodes to one another.

5. A cathode ray tube comprising an envelope, means including a cathode and an accelerating anode for producing a concentrated electron beam therein, a fluorescent screen adapted to be impinged by said electron beam for providing a visual presentation of the position of said beam, a horizontal deflection system and a first vertical deflection system interposed between said electron gun and said screen, said first deflection system being adapted to produce a fixed deflection of said beam away from the longitudinal axis of said tube and a second vertical deflection system to which signals to be measured are applied, said second vertical deflection system being located between said first deflection system and said screen and displaced from said longitudinal axis, said second vertical deflection system comprising a first unshielded electrode and a second electrode disposed transverse to said electron beam, said second electrode being surrounded by a shield having an aperture arranged to partially expose said first and second electrodes to one another.

6. A cathode ray tube for measurement of high voltage input signals of a given polarity comprising an envelope containing at one end thereof an electron gun for producing a concentrated electron beam and a fluorescent screen at said other end, bias deflection means for deflecting said beam from the central longitudinal axis of said tube in the absence of said signals, an electrostatic deflection system interposed between said bias deflection means and said screen and including an unshielded electrode and an electrode partially enclosed by a shield having an aperture therein arranged to partially expose said first and said second electrodes to one another, said deflection system being displaced from said axis so that substantially the entire portion of said screen may be utilized for presentation of said input signals.

7. A cathode ray tube for measurement of high voltage input signals of a given polarity comprising an envelope containing at one end thereof an electron gun for producing a concentrated electron beam and a fluorescent screen at said other end, bias deflection means for deflecting said beam from the central longitudinal axis of said tube in the absence of said signals, an electrostatic deflection system interposed between said bias deflection means and said screen and including an unshielded electrode and an electrode partially enclosed by a shield having an aperture therein arranged to partially expose said first and said second electrodes to one another, said deflection system being displaced from said axis so that substantially the entire portion of said screen may be utilized for presentation of said input signals, means for connecting said first electrode and said shield to one terminal of a source of said high voltage signals and means for connecting said second electrode to the other terminal of said source.

8. A cathode ray tube for measurement of high voltage signals comprising an envelope containing a means for producing a concentrated electron beam, a first set of deflection electrodes for producing a deflection of said beam in a first direction, a second set of deflection electrodes for producing deflection of said beam in a direction normal to said first direction, said second set of electrodes including a first electrode having an arcuate configuration transverse to said beam, and a second electrode, said first and second electrodes having their longitudinal axes arranged normal to said electron beam and spaced from said first electrode, and an apertured shield surrounding said second electrode, said aperture having a length greater than its width and being arranged to partially expose said first and said second electrodes to one another.

9. A cathode ray tube for measurement of high voltage signals comprising an envelope containing a means for producing a concentrated electron beam, a first set of deflection electrodes for producing a deflection of said beam in a first direction, a second set of deflection electrodes for producing deflection of said beam in a direction normal to said first direction, said second set of electrodes including a first electrode having an arcuate configuration transverse to said beam, and a second electrode circular in cross section whose longitudinal axis is arranged normal to said electron beam and spaced from said first electrode, and a curved apertured shield surrounding said second electrode, said aperture being arranged to partially expose said first and said second electrodes to one another, the radius of curvature of said shield being approximately six times the radius of said second electrode.

10. An electrostatic deflection system for deflection of an electron beam comprising a first deflection electrode having an arcuate configuration transverse to said beam, and a second deflection electrode spaced from said first electrode, said first and second electrodes having their longitudinal axes arranged normal to said electron beam, and a curved apertured shield surrounding said second electrode, said aperture having a length greater than its width and being arranged to partially expose said first and said second electrodes to one another.

11. An electrostatic deflection system as recited in claim 10 wherein the radius of curvature of said shield is approximately six times the radius of said second electrode.

RUDOLF C. HERGENROTHER.
  HERMANN GUNTHER RUDENBERG.

REFERENCES CITED

The following references are of record in the file of this patent:

UNITED STATES PATENTS

| Number | Name | Date |
|---|---|---|
| 2,126,694 | Wilson | Aug. 9, 1938 |
| 2,161,437 | Sprague et al. | June 6, 1939 |
| 2,550,212 | Wideroe | Apr. 24, 1951 |